Dec. 27, 1955     H. O. SCHMITT, JR., ET AL     2,728,263
MAGAZINE-SHUTTER ACTUATING DEVICE FOR MOTION PICTURE CAMERAS
Filed Nov. 14, 1951     2 Sheets-Sheet 1
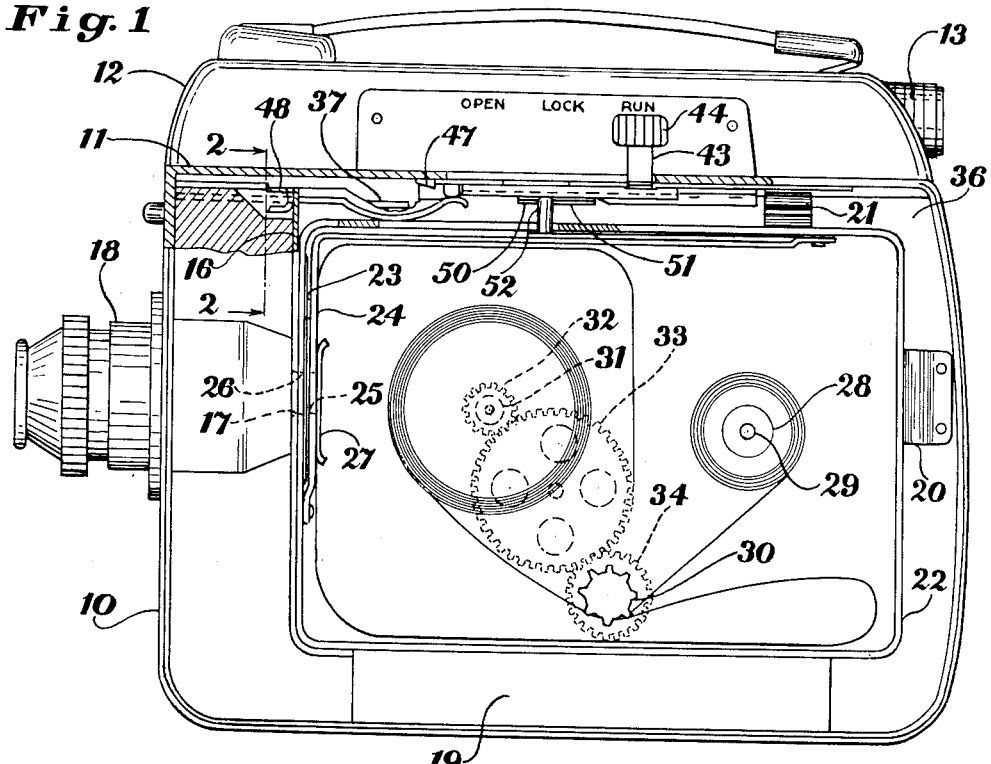
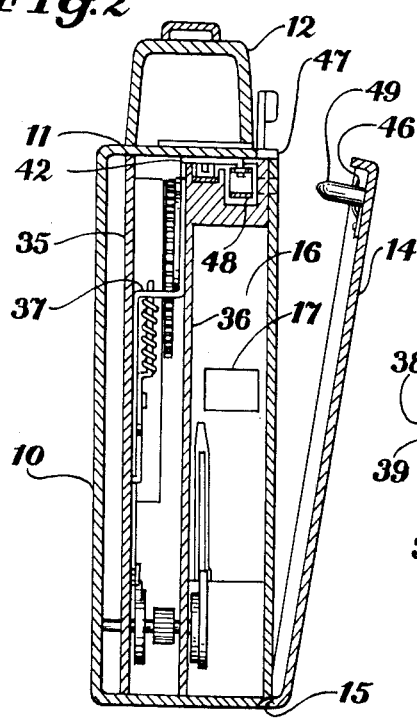
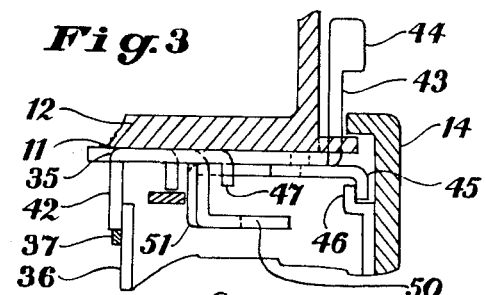
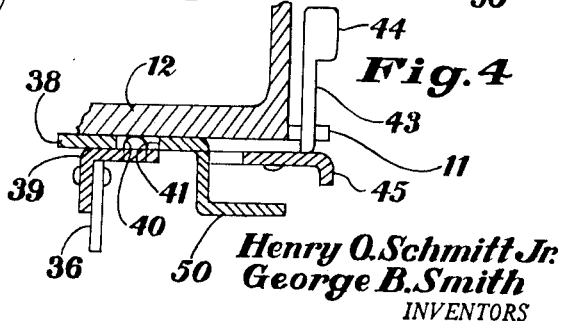
Henry O. Schmitt Jr.
George B. Smith
INVENTORS
BY
ATTORNEYS

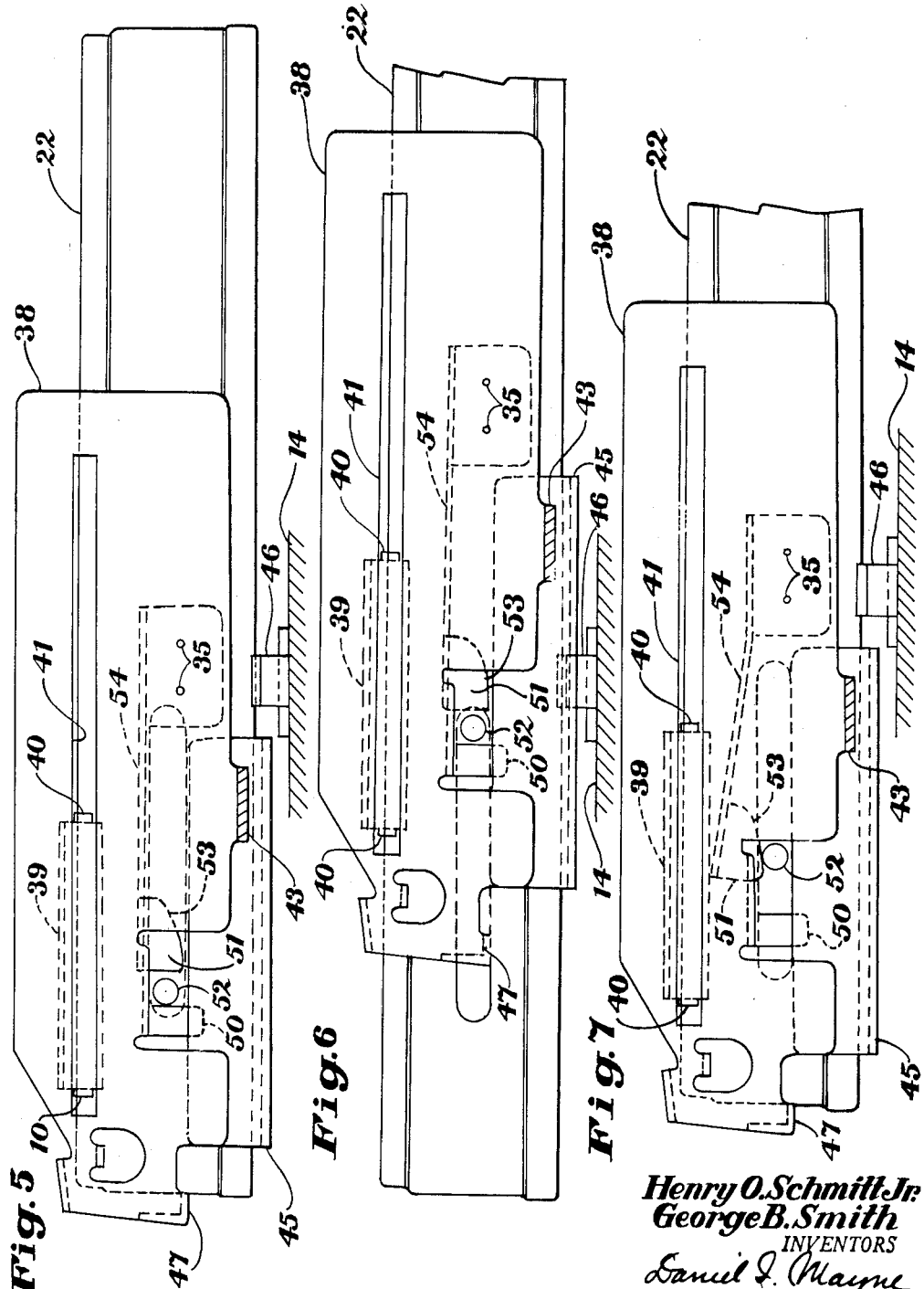

United States Patent Office 2,728,263
Patented Dec. 27, 1955

2,728,263

MAGAZINE-SHUTTER ACTUATING DEVICE FOR MOTION PICTURE CAMERAS

Henry O. Schmitt, Jr., and George B. Smith, Rochester, N. Y., assignors to Eastman Kodak Company, Rochester, N. Y., a corporation of New Jersey Application November 14, 1951, Serial No. 256,245

2 Claims. (Cl. 88—17)

The present invention relates to motion picture apparatus and more particularly to magazine type motion picture cameras having cover latching means whose normal operation automatically actuates the shutter on a magazine positioned in the camera.

It is usual in motion picture cameras of the magazine type to provide a latching means for fastening a cover to an opening in the camera through which a magazine is inserted and removed and to arrange such latching means so that its movement to and from latching position opens and closes the shutter of a film magazine contained in the camera and unblocks and blocks the film moving mechanism. However, known latching arrangements which actuate the magazine shutter after the magazine is in operative position require the shutter pin to be in fully closed position. Through accident or carelessness the shutter pin is sometimes moved from fully closed position and, dependent upon its position, the operator has difficulty in placing the magazines in the camera or the magazine is easily inserted but the latching means cannot be moved to the position where it unblocks the film moving mechanism and no pictures can be taken. Furthermore, the pin being improperly positioned, movement of the latching means to unlatching position will not move the pin to shutter closing position.

The primary object of the present invention is the provision of a magazine type motion picture camera which permits the insertion of a magazine with its shutter actuating pin in any position, permits operation of the camera regardless of the original position of the pin, and returns the pin to shutter closed position when the camera cover is unlatched for removal of a magazine.

Other objects and advantages of the invention will be evident to those skilled in the art from the following description when read in connection with the accompanying drawings in which:

Fig. 1 is a side elevation of a magazine type motion picture camera with the cover removed and with parts broken away;

Fig. 2 is a vertical cross-section of the camera taken on line 2—2 of Fig. 1;

Figs. 3 and 4 are, respectively, partial views showing details of a movable latching means;

Figs. 5 and 6 are top views showing the relation between the latching means and the magazine when the latching means is in "open" and "run" positions, respectively; and Fig. 7 is a top view of the latching means and the magazine showing the shutter pin improperly located.

The motion picture camera illustrated in the drawing includes a casing 10, the upper lateral wall 11 of which carries a housing 12 for a view finder having an eyepiece 13 and a side wall 14 of which is hinged along its bottom edge 15 so that it may be opened to permit access to the magazine chamber defined by a plate 16 having an aperture 17 alined with an objective 18, a locating member 19 and springs 20 and 21 which press a film magazine 22 against the plate 16 and the locating member 19, respectively.

The closure means for the magazine 22 may comprise a flexible slide 23, a guide member 24 secured to and spaced from the lateral wall of the magazine 22 to form a guideway from the flexible slide 23. The guide 24 and the front lateral wall of the magazine 22 are provided with registered openings 25 and 26, respectively, located to register with the aperture 17 when the magazine 22 is located in the camera. The film gate is shown located within the magazine 22 and comprised of the guide member 24 and a presser member 27 mounted in any suitable manner.

Any desired film path and any suitable devices may be employed to handle the film in the magazine but are here shown as including a film supply core 28 mounted on a spindle 29, a sprocket 30 adapted to be driven by the camera mechanism, and a take-up core 31 adapted to be driven by the sprocket 30 through gears 32, 33 and 34.

The camera drive mechanism which forms no part of the present invention is mounted between two mechanism plates 35 and 36 and includes a bar 37 which is moved upwardly by the movement of an operating lever to start the camera drive. This drive mechanism may take any desired form and the one disclosed in Patent 2,080,021 to Wittel is quite suitable.

The latching means assembly comprises a base plate 38 slidable lengthwise of the camera in a track formed of the lower face of the upper lateral wall 11 and a plate 39 secured to the mechanism wall 36 and having at its ends upturned ears 40 extending into a longitudinal slot 41 in the base plate 38 to form a guide. As best seen in Figs. 2 and 3 the left side of the plate 38 has formed thereon a fin 42 which depends behind the mechanism plate 36 to engage the top of movable bar 37 in all positions of the latching means except the right one. The right side of the plate 38 has an upturned arm 43 provided with a thumb grip 44 for moving the plate 38 back and forth between "open," "lock" and "run" positions which may be appropriately indicated on the side of the finder housing 12. Secured to the plate 38 is a flange member 45 positioned to engage a catch 46 carried on the inner face of the hinged side wall or cover 14 to lock the cover 14 in closed position.

A tooth 47 is provided on the sliding plate 38 in line with a leaf spring 48 provided with a notch adapted to receive the tooth 47 in the left hand extreme position of the plate 38. During engagement of the leaf spring 48 and the tooth 47 the plate 38 is in "open" position and cannot be moved until the cover 14 is closed at which time a tapered pin 49 mounted on the cover 14 engages the leaf spring 48 to move it out of engagement with the tooth 47.

The latching means assembly also cooperates with the flexible slide 23 on the film magazine to move it into appropriate positions corresponding to the "open" and "run" positions of the latching means. For this purpose two spaced ears 50 and 51 carried by the slide 38 have facing edges defining an open-end slot for receiving a pin 52 secured to the flexible shutter slide 23. When this pin 52 is properly positioned between these ears 50 and 51, it moves with the plate 38 to move the shutter slide 23 to uncover the exposure apertures 25 and 26 when the plate 38 is in the "run" position shown in Fig. 1 and to close these apertures when the plate 38 is in the "open" position. Since the thumb grip 44 has to be moved to the extreme left where the tooth 47 engages the leaf spring 48 before the camera cover 14 can be opened to remove the magazine 22 it assures that the magazine shutter 23 will be closed. Also when the magazine 22 is inserted, the cover 14 has to be closed and the thumb grip 44 moved to the extreme right before the camera can be operated; thus assuring that the magazine shutter 23 is open before picture taking is attempted.

The success of the above protective features depends upon the magazine shutter pin 52 being in its extreme left position when the magazine 22 is placed in the camera. It sometimes happens that while the magazine 22 is out of the camera the pin 52 becomes displaced some distance toward the right and in accordance with the invention the latching assembly is so constructed that regardless of the position of the pin 52 when the magazine 22 is placed in the camera the thumb grip 44 can be moved to the "run" position at which time the magazine shutter 23 will be fully opened and the pin 52 will be properly engaged by the ears 50 and 51 so that upon moving the thumb grip 44 to the "open" position the magazine shutter 23 will be fully closed.

This last-mentioned construction is obtained by providing the pin engaging ear 51 with a cam surface 53 and mounting it resiliently as on one end of a leaf spring 54 having its other end anchored to the plate 18 by rivets 55 so that the ear 51 is urged towards its normal position where it faces the ear 50 but may be displaced from such position to permit its cam face 53 to ride over the pin 52 if the magazine 22 happens to be placed in the camera with the pin 52 in other than the position where the magazine shutter 23 is fully closed.

The manner in which the latching means which properly actuate the magazine shutter 23 under all conditions will be evident from Figs. 5, 6 and 7. In Fig. 5 the latching means is at the left end of its movement, i. e., in "open" position, with the shutter pin 52 between the two ears 50 and 51 which is the normal position when the magazine is inserted or removed. Fig. 6 illustrates the latching means at the right end of its movement, i. e., in "run" position, and the shutter pin 52 has opened the magazine shutter 23.

Fig. 7 shows the magazine 22 inserted in the camera with the shutter pin 52 displaced to the right of shutter-closed position. In this abnormal position, the pin 52 does not enter the slot between the ears 50 and 51. The operator is unaware of this condition and moves the slide plate 38 as usual to the "lock" or "run" position as desired. During such movement the cam face 53 rides over the pin 52 and, as soon as clearance permits, the spring 54 returns the ear 51 to its normal position where the pin 52 again becomes captive and moves with the plate 38 as intended. It is evident that when the slide plate 38 is again moved to "open" position the magazine shutter 23 will be fully closed and the magazine 22 when removed from the camera will be sealed against light leakage to the end that the original error has been corrected without conscious effort and in fact without the operator's knowing of the original error until after the film has been processed.

It will be apparent from the above that the improved structure provided by the present invention facilitates the operation of magazine type motion picture cameras and reduces to a minimum the spoilage of film due to inadvertent movement of the magazine shutter from its closed position while the magazine is outside the camera. The specific embodiment described for the purpose of disclosing the invention is the preferred one but various modifications may be made without departing from the scope of the invention defined by the appended claims.

What we claim as new and desire to secure by Letters Patent of the United States is:

1. In a motion picture camera adapted to use interchangeable magazines provided with a protuberance movable between two fixed points for opening and closing a shutter member in the magazine and in which a latching member on said camera is movable between two extreme positions where, respectively, a cover for the magazine chamber is unlocked and the camera drive mechanism is blocked to prevent actuation thereof during removal and insertion of a magazine, and the cover for the magazine chamber is locked and the camera drive mechanism is unblocked to permit normal operation thereof, means carried by the latching member and movable therewith including a member fixed thereto and arranged in a plane normal to and intersecting the axis of the protuberance when the magazine is in the camera for opening the shutter, and a movable member mounted on said latching member for movement therewith and having a portion thereof arranged in said plane, biased into a position spaced from said fixed member to provide an open-end slot to normally receive the protuberance and for closing the shutter when the magazine is in the camera, and adapted to yield to and be displaced in said plane by said protuberance when the protuberance is displaced from a normal position with respect to said slot for permitting insertion of the magazine into the camera and engagement of said slot with the protuberance to permit opening of said shutter by said fixed member upon movement of said latching member from the unlocking position to the locking position.

2. In a motion picture camera adapted to use interchangeable magazines, each of which is provided with a pin movable a fixed distance to open and close a shutter in the magazine and having a latching member supported on the camera and slidable between a first position where a magazine may be inserted or removed and a second position where the camera may operate, means on said latching member adapted for interlocking engagement with a magazine shutter pin comprising a fixed member on said latching member and movable therewith, extending transversely of the direction of movement of the shutter pin in a plane normal to and intersecting the axis of said pin and positioned beyond the pin in shutter-closed position for engaging said pin to open said shutter when said latching member is moved from said first position to said second position, and a resilient member fixed to and movable with said latching member, extending transversely of the direction of movement of the shutter pin and in said plane, and positioned beyond the pin in shutter-open position for engaging said pin to close said shutter when said latching member is moved from said second position to said first position, said resilient member being so shaped and mounted that it is rigid when engaging the pin while moving from said second position to said first position and rides over the pin when engaged thereby while moving from said first position to said second position.

References Cited in the file of this patent

UNITED STATES PATENTS

| | | |
|---|---|---|
| 2,080,021 | Wittel | May 11, 1937 |
| 2,342,512 | Gaty | Feb. 22, 1944 |
| 2,624,233 | Foster | Jan. 6, 1953 |